United States Patent
Pohlmann et al.

(10) Patent No.: US 8,680,213 B2
(45) Date of Patent: Mar. 25, 2014

(54) THERMOPLASTIC POLYURETHANES

(75) Inventors: Norbert Pohlmann, Nortrup (DE); Andreas Przybilski, Lemförde (DE); Rolf Steinberger, Schledehausen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 878 days.

(21) Appl. No.: 11/774,766

(22) Filed: Jul. 9, 2007

(65) Prior Publication Data

US 2008/0146749 A1 Jun. 19, 2008

Related U.S. Application Data

(63) Continuation of application No. 10/484,576, filed as application No. PCT/EP02/08452 on Jul. 30, 2002, now Pat. No. 7,241,854.

(30) Foreign Application Priority Data

Aug. 10, 2001 (DE) .................................. 10138298

(51) Int. Cl.
*C08L 75/06* (2006.01)
(52) U.S. Cl.
USPC ...... 525/453; 525/424; 525/440.01; 525/455; 525/460; 528/44; 528/76; 528/80; 528/85
(58) Field of Classification Search
None
See application file for complete search history.

(56) References Cited

U.S. PATENT DOCUMENTS

| | | | |
|---|---|---|---|
| 4,048,104 A | 9/1977 | Svoboda et al. | |
| 4,102,868 A | 7/1978 | Genetti et al. | |
| 4,186,257 A | 1/1980 | Blahak et al. | |
| 4,223,068 A | 9/1980 | Carlstrom et al. | |
| 4,483,970 A | 11/1984 | Huntjens et al. | |
| 4,873,268 A | 10/1989 | Hallmark et al. | |
| 5,115,073 A | 5/1992 | Meckel et al. | |
| 7,241,854 B2 * | 7/2007 | Pohlmann et al. | 528/85 |

FOREIGN PATENT DOCUMENTS

| | | |
|---|---|---|
| DE | 2646647 A | 4/1977 |
| DE | 3933204 A1 | 4/1991 |
| DE | 4113891 A1 | 10/1992 |
| DE | 4128274 A1 | 3/1993 |
| DE | 19939112 A1 | 2/2001 |
| EP | 0102115 A1 | 3/1984 |
| EP | 0159053 A1 | 10/1985 |
| EP | 0334186 A2 | 9/1989 |
| EP | 0656397 A1 | 6/1995 |
| EP | 0846712 A1 | 6/1998 |
| GB | 1513197 | 6/1978 |
| WO | WO 9951656 A1 | 10/1999 |

OTHER PUBLICATIONS

"The Melting Point of Polyethylene Terephthalate" authored by Taylor and published in Polymer (1962) 3, 543-547.*
"Polypropylene Oxide III.-Crystalizability, Fusion, and Glass Formation" authored by Allen et al. and published in Polymer (1964) 5, 547-552.*
International Search Report PCT/EP02/08452, dated Nov. 12, 2002.

* cited by examiner

*Primary Examiner* — Marc Zimmer
(74) *Attorney, Agent, or Firm* — Howard & Howard Attorneys PLLC

(57) ABSTRACT

Thermoplastic polyurethanes are obtainable by reacting (a) isocyanates with (b1) polyesterdiols having a melting point greater than 150-C, (b2) polyetherdiols and/or polyesterdiols, each having a melting point of less than 150-C and a molecular weight of from 501 to 8 000 g/mol, and, if required, (c) diols having a molecular weight of from 62 to 500 g/mol.

39 Claims, No Drawings

THERMOPLASTIC POLYURETHANES

The present invention relates to thermoplastic polyurethanes obtainable by reacting (a) isocyanates with (b1) polyesterdiols having a melting point greater than 150° C. preferably from 151 to 260° C., particularly preferably from 165 to 245° C., (b2) polyetherdiols and/or polyesterdiols, each having a melting point of less than 150° C., preferably from 0 to 149° C., and a molecular weight of from 501 to 8 000 g/mol, and, if required, (c) diols having a molecular weight of from 62 to 500 g/mol. The present invention furthermore relates to a process for the preparation of thermoplastic polyurethanes and products containing the novel thermoplastic polyurethanes.

Thermoplastic elastomers are based on a standard structural principle, regardless of their chemical composition. They are block copolymers in which hard blocks are connected to soft blocks in a polymer chain. Hard blocks are to be understood as meaning polymer segments whose softening temperature—glass transition temperature or crystallite melting point—is far above the temperature of use. Soft blocks are polymer segments having softening temperatures well below the temperature of use, preferably less than 0° C. The hard blocks form physical networks which can be reversibly cleaved during the thermoplastic processing and reformed on cooling.

Typical examples are styrene/butadiene block copolymers having hard polystyrene blocks (glass transition temperature about 105° C.) and soft polybutadiene blocks (glass transition temperature about −90° C.) or thermoplastic polyurethanes (TPU). The latter product group has, as a semicrystalline hard phase, the reaction product of an organic diisocyanate with a low molecular weight diol and, as an amorphous soft phase, the reaction product of an organic diisocyanate with a polyesterdiol or a polyetherdiol having molecular weights of, usually, from 500 to 5 000 g/mol.

The solidification behavior of this semicrystalline polyurethane hard phase is however very variable and can easily be influenced, deteriorations generally occurring. For example, an increase in the index (ratio of moles of isocyanate to moles of OH-containing components) to the range of from 1.05 to 1.20 has a very adverse effect, as does the addition of other polymers. The conventional preparation processes, such as belt and extruder processes, also lead, with the same formulation, to TPU having substantially different crystallization behavior. However, in all processing methods, whether injection molding or extrusion, a constant and rapid solidification rate is a substantial factor influencing the uniform quality of the shaped articles, properties such as hardness, strength, rigidity and heat distortion resistance, and the cost-efficiency of the production.

A wide range of efforts has been made to compensate this disadvantageous behavior of the TPU. Apart from the addition of nucleating agents, e.g. finely divided talc, attempts have also been made to achieve improvements by adding other, rapidly crystallizing polymers. Thermoplastic, semicrystalline polyesters were particularly frequently used, among these preferably polybutylene terephthalate, owing to its melting range of from 220 to 230° C. which very well matches the customary TPU processing temperatures.

Thus, DE-A 26 46 647 describes the compounding of prepared, high molecular weight polyesters and high molecular weight TPU in single-screw or twin-screw extruders. EP-A 334 186 and DE-A 41 13 891 disclose the compounding of high molecular weight polyesters and TPU monomer components DE-A 41 28 274 describes the addition of up to 5% of diisocyanate in excess for such processes. For an improvement in the compatibility, EP-A 656 397 describes the use of a TPU having an index greater than 1.16 and admixture with high molecular weight polyester. These processes lead to two-phase polymer mixtures, the polymer component, when present in amounts greater than 50%, having particle sizes of from 10 to 50 mm or <5 mm with the use of additional diisocyanate. Such molding materials are said to have higher strength, rigidity and heat distortion resistance than an unmodified TPU. On the other hand, the fact that a substantial reduction in the solidification rate occurs in particular on addition of diisocyanate in excess is very disadvantageous.

EP-A 102 115 and EP-A 846 712 describe the reaction of polyalkylene terephthalates with aliphatic polyesters to give block copolyester-esters, which in turn are then reacted with organic diisocyanates. The polycondensation of dimethyl terephthalate, butanediol and polyetherdiol and the subsequent reaction of the polyester with further polyetherdiol and diisocyanates to give a high molecular weight product are described in WO 99/51656. The long reaction times and the high temperatures, which easily lead to pronounced discoloration of the molding materials, are disadvantageous in all these processes.

DE-A 199 39 112 describes the degradation of hard thermoplastic polyurethanes with low molecular weight diols and the subsequent reaction with isocyanates for the preparation of flexible TPU.

It is an object of the present invention to provide thermoplastic polyurethanes having improved crystallization behavior of the hard phase and a very constant and rapid solidification rate during processing.

We have found that this object is achieved by the thermoplastic polyurethanes described at the outset.

Thermoplastic polyurethanes in which the molar ratio of the diols (c) having a molecular weight of from 62 to 500 g/mol to the component (b2) is less than 0.2, particularly preferably from 0.1 to 0.01, are preferred.

Thermoplastic polyurethanes in which the polyesterdiols (b1), which preferably have a molecular weight of from 1 000 to 5 000 g/mol, have the following structural unit (I):

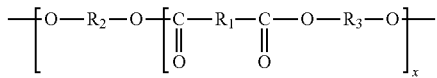

where

R1 is a carbon skeleton of 2 to 15 carbon atoms, preferably an alkylene group of 2 to 15 carbon atoms and/or a bivalent aromatic radical of 6 to 15, particularly preferably 6 to 12, carbon atoms, R2 is a straight-chain or branched alkylene group of 2 to 8, preferably 2 to 6, particularly preferably 2 to 4, carbon atoms, in particular —CH2-CH2- and/or —CH2-CH2-CH2-CH2-, R3 is a straight-chain or branched alkylene group of 2 to 8, preferably 2 to 6, particularly preferably 2 to 4, carbon atoms, in particular —CH2-CH2- and/or —CH2-CH2-CH2-CH2-, and X is an integer from 5 to 30. In this preferred embodiment, the melting point described at the outset and according to the invention and/or the molecular weight according to the invention relate to the structural unit (I) shown.

In this document, the term melting point is to be understood as meaning the maximum of the melting peak of a heating curve which was measured using a commercial apparatus (e.g. DSC 7/Perkin-Elmer), preferably a DSC apparatus, and evaluated according to ISO 11357-3.

The molecular weights stated in this document are the number average molecular weights in [g/mol].

The novel thermoplastic polyurethanes can preferably be prepared by (i) reacting a preferably high molecular weight, preferably semicrystalline, thermoplastic polyester with a diol (c) and then (ii) reacting the reaction product from (i) containing (b1) polyesterdiol having a melting point greater than 150° C. and, if required, (c) diol together with (b2) polyetherdiols and/or polyesterdiols, each having a melting point of less than 150° C. and a molecular weight of from 501 to 8 0000 g/mol, and, if required, further (c) diols having a molecular weight of from 62 to 500 g/mol with (a) isocyanate, in the presence or absence of (d) catalysts and/or (e) assistants.

In the reaction (ii), the molar ratio of the diols (c) having a molecular weight of from 62 to 500 g/mol to the component (b2) is preferably less than 0.2, especially from 0.1 to 0.01.

Whereas the hard phases are provided for the end product by the step (i), by the polyester used in step (i), the soft phases are synthesized by the use of the component (b2) in step (ii). In the novel technical procedure, polyesters having a pronounced, readily crystallizing hard phase structure are melted, preferably in a reaction extruder, and are first degraded with a low molecular weight diol to give shorter polyesters having free terminal hydroxyl groups. Here, the original high tendency of the polyester to crystallize is retained and can subsequently be utilized for obtaining, in a rapid reaction, TPU having the advantageous properties, such as high tensile strength values, low abrasion values and, owing to the high and narrow melting range, high heat distortion resistances and low compression sets.

Thus, in the novel process, high molecular weight, semicrystalline, thermoplastic polyesters are preferably degraded with low molecular weight diols (c) under suitable conditions in a short reaction time to give rapidly crystallizing polyester diols (b1), which in turn are then incorporated, with other polyesterdiols and/or polyetherdiols and diisocyanates, into high molecular weight polymer chains.

The thermoplastic polyester used preferably has, i.e. before the reaction of (i) with the diol (c), a molecular weight of from 15 000 to 40 000 g/mol and preferably a melting point greater than 160° C., particularly preferably from 170 to 260° C.

Generally known, preferably high molecular weight, preferably semicrystalline, thermoplastic polyesters, for example in granulated form, can be used as starting material, i.e. as polyester which is reacted in step (i), preferably in the molten state, particularly preferably at from 230 to 280° C., preferably for from 0.1 to 4 minutes, particularly preferably from 0.3 to 1 minute, with the diol or diols (c). Suitable polyesters are based, for example, on aliphatic □-hydroxycarboxylic acids and/or on aliphatic, cycloaliphatic, araliphatic and/or aromatic dicarboxylic acids, for example lactic acid and/or terephthalic acid, and aliphatic, cycloaliphatic, araliphatic and/or aromatic dialcohols, for example 1,2-ethanediol, 1,4-butanediol and/or 1,6-hexanediol.

Particularly preferably used polyesters are poly-L-lactic acid and/or polyalkylene terephthalate, for example polyethylene terephthalate, polypropylene terephthalate or polybutylene terephthalate, in particular polybutylene terephthalate.

The preparation of these esters from said starting materials is generally known to a person skilled in the art and is widely described. Suitable polyesters are furthermore commercially available.

The thermoplastic polyester is melted, preferably at from 180 to 270° C. The reaction (i) with the dial (c) is preferably carried out at from 230 to 280° C., preferably from 240 to 280° C.

Generally known diols having a molecular weight of from 62 to 500 g/mol, for example those mentioned below, e.g. ethylene glycol, 1,3-propanediol, 1,4-butanediol, 1,5-pentanediol, 1,6-hexanediol, heptanediol, octanediol, preferably 1,4-butanediol and/or 1,2-ethanediol, may be used as diol (c) in step (i) for the reaction with the thermoplastic polyester and, if required, in step (ii).

The weight ratio of the thermoplastic polyester to the diol (c) in step (i) is usually from 100:1.0 to 100:10, preferably from 100:1.5 to 100:8.0.

The reaction of the thermoplastic polyester with the diol (c) in the reaction step (i) is preferably carried out in the presence of conventional catalysts, for example those which are described below. Catalysts based on metals are preferably used for this reaction. The reaction in step (i) is preferably carried out in the presence of from 0.1 to 2% by weight, based on the weight of the diol (c), of catalysts. The reaction in the presence of such catalysts is advantageous for enabling the reaction to be carried out in the available short residence time in the reactor, for example a reaction extruder.

Examples of suitable catalysts for this reaction step (i) are tetrabutyl orthotitanate and/or tin(II) dioctanoate, preferably tin dioctanoate.

The polyesterdiol (b1) as a reaction product from (i) preferably has a molecular weight of from 1 000 to 5 000 g/mol. The melting point of the polyesterdiol as a reaction product from (i) is preferably from 150 to 260° C., particularly preferably from 151 to 260° C., in particular from 165 to 245° C., i.e. the reaction product of the thermoplastic polyester with the dial (c) in step (i) contains compounds having said melting point which are used in the subsequent step (ii).

As a result of the reaction of the thermoplastic polyester with the diol (c) in step (i), the polymer chain of the polyester is cleaved by transesterification by the diol (c). The reaction product of the TPU therefore has free terminal hydroxyl groups and is further processed according to the invention in the further step (ii) to give the actual product, the TPU.

The reaction of the reaction product from step (i) in step (ii) is effected, according to the invention, by adding (a) isocyanate (a) and (b2) polyetherdiols and/or polyesterdiols, each having a melting point of less than 150° C. and a molecular weight of from 501 to 8 000 g/mol, and, if required, further diols (c) having a molecular weight of from 62 to 500, (d) catalysts and/or (e) assistants to the reaction product from (i). The reaction of the reaction product with the isocyanate is effected via the terminal hydroxyl groups formed in step (i). The reaction in step (ii) is preferably effected at from 190 to 250° C., preferably for from 0.5 to 5, particularly preferably from 0.5 to 2, minutes, preferably in a reaction extruder, particularly preferably in the same reaction extruder in which the step (i) was also carried out. For example, the reaction of step (i) can be effected in the first barrels of a conventional reaction extruder and the corresponding reaction of step (ii) can be carried out at a downstream point, i.e. in downstream barrels, after the addition of the components (a) and (b2). For example, the first 30 to 50% of the length of the reaction extruder can be used for step (i) and the remaining 50 to 70% can be employed for step (ii).

The reaction in step (ii) is preferably effected with an excess of the isocyanate groups relative to the groups reactive toward isocyanates. In the reaction (ii), the ratio of the isocyanate groups to the to the hydroxyl groups is from 1:1 to 1.2:1, particularly preferably from 1.02:1 to 1.2.1.

The reactions (i) and (ii) are preferably carried out in a generally known reaction extruder. Such reaction extruders are described by way of example in Werner & Pfleiderer's company publications or in DE-A 2 302 564.

The novel process is preferably carried out in such a way that at least one thermoplastic polyester, e.g. polybutylene terephthalate, is metered into the first barrel of a reaction extruder and is melted at, preferably, from 180 to 270° C., especially from 240 to 270° C., a diol (c), e.g. butanediol, and preferably a transesterification catalyst are added to a downstream barrel, the polyester is degraded by the diol (c) at from 240 to 280° C. to give polyester oligomers having terminal hydroxyl groups and molecular weights of from 1 000 to 5 000 g/mol, isocyanate (a) and (b2) compounds reactive toward isocyanates and having a molecular weight of from 501 to 8 000 g/mol and, if required, (c) diols having a molecular weight of from 62 to 500, (d) catalysts and/or (e) assistants are metered into a downstream barrel and the synthesis to give the novel thermoplastic polyurethanes is then carried out at from 190 to 250° C.

In step (ii), no (c) diols having a molecular weight of from 62 to 500 are fed in, with the exception of the (c) diols having a molecular weight of from 62 to 500 which are contained in the reaction product of (i).

The reaction extruder preferably has neutral and/or backward-conveying kneading blocks and backward-conveying elements in the region in which the thermoplastic polyester is melted and preferably screw mixing elements, toothed disks and/or toothed mixing elements in combination with backward-conveying elements in the region in which the thermoplastic polyester is reacted with the diol.

Downstream of the reaction extruder, the clear melt is usually fed by means of a gear pump to an underwater granulation stage and is granulated.

The novel thermoplastic polyurethanes have optically clear, single-phase melts which rapidly solidify and, owing to the semicrystalline hard polyester phase, form slightly opaque to white opaque moldings. The rapid solidification behavior is a decisive advantage compared with known formulations and preparation processes for thermoplastic polyurethanes. The rapid solidification behavior is so pronounced that even products having hardnesses of from 50 to 60 Shore A can be processed by injection molding with cycle times of less than 35 seconds. In extrusion too, for example in the production of blown films, no TPU-typical problems such as adhesion or blocking of the films or tubes occur.

The amount of the thermoplastic polyester in the end product, i.e. the thermoplastic polyurethane, is preferably from 5 to 75% by weight. The novel thermoplastic polyurethanes are particularly preferably products of the reaction of a mixture containing from 10 to 70% by weight of the reaction product from (i), from 10 to 80% by weight of (b2) and from 10 to 20% by weight of (a), the stated weights being based on the total weight of the mixture containing (a), (b2), (d), (e) and the reaction product from (i).

The novel thermoplastic polyurethanes preferably have a hardness of from Shore 45 A to Shore 78 D, particularly preferably from 50 A to 75 D.

The novel thermoplastic polyurethanes preferably have the following structural unit (II):

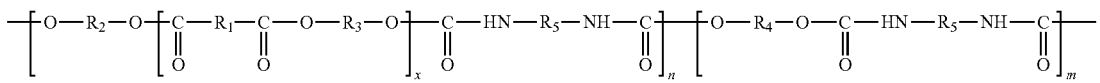

where

R1 is a carbon skeleton of 2 to 15 carbon atoms, preferably an alkylene group of 2 to 15 carbon atoms and/or an aromatic radical of 6 to 15 carbon atoms, R2 is a straight-chain or branched alkylene group of 2 to 8, preferably 2 to 6, particularly preferably 2 to 4, carbon atoms, in particular —CH2-CH2- and/or —CH2-CH2-CH2-CH2-, R3 is a straight-chain or branched alkylene group of 2 to 8, preferably 2 to 6, particularly preferably 2 to 4, carbon atoms, in particular CH2-CH2- and/or —CH2-CH2-CH2-CH2-, R4 is a radical which arises from the use of polyetherdiols and/or polyesterdiols, each having molecular weights of from 501 to 8 000 g/mol, as (b2), or from the use of alkanediols of 2 to 12 carbon atoms, R5 is a carbon skeleton of 2 to 15 carbon atoms, preferably an alkylene group of 2 to 15 carbon atoms and/or a bivalent aromatic radical of 6 to 18, particularly preferably 6 to 15, carbon atoms, X is an integer from 5 to 30 and n and m are each an integer from 5 to 20.

R1, R2 and R3 are defined by the reaction product of the thermoplastic polyester with the diol (c) in (i), R4 is defined by the starting components (b2) and, if required, (c) and R5 is defined by the isocyanate used.

The novel product of step (ii), i.e. the TPU, can be extruded, cooled and granulated.

The processing of TPU prepared according to the invention to give the desired films, fibers, shaped articles, claddings in automobiles, rollers, seals, cable plugs, bellows, tubes, cable sheaths, trailing cables, belts or damping elements, in particular films, can be effected by conventional methods, for example injection molding, extrusion, spinning process or sinter process, which is also known as a powder slush process.

The components (a), (b2), (c), (d) and/or (e) usually used in the preparation of the TPU are to be described below by way of example:

a) Organic isocyanates (a) used are conventional aliphatic, cycloaliphatic, araliphatic and/or aromatic isocyanates, preferably diisocyanates, for example tri-, tetra-, penta-, hexa- or hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, dicyclohexylmethane 4,41-, 2,4'- and/or 2,2'-diisocyanate, diphenylmethane 2,2'-, 2,4'- and/or 4,4'-diisocyanate (MDI), naphthylene 1,5-diisocyanate (NDT), tolylene 2,4- and/or 2,6-diisocyanate (TDI), diphenylmethane diisocyanate, dimethylbiphenyl 3,3'-diisocyanate, diphenylethane 1,2-diisocyanate and/or phenylene diisocyanate, preferably diphenylmethane 2,2'-, 2,4'- and/or 4,4'-diisocyanate (MDI) and/or hexamethylene diisocyanate (HDI).

b) Those compounds (b2) reactive toward isocyanates which are used in addition to the novel polyesterdiols (b1) are, for example, polyhydroxy compounds, also referred to as polyols, having molecular weights of from 501 to 8 000, preferably from 700 to 6 000, in particular from 800 to 4 000, and preferably an average functionality of from 1.8 to 2.6, preferably from 1.9 to 2.2, in particular 2. The term functionality is to be understood in particular as meaning the number of active hydrogen atoms, in particular hydroxyl groups. Polyesterols and/or polyetherols and/or polycarbonatediols are preferably used as (b2), particularly preferably polyesterdiols, for example polycaprolactone, and/or polyetherpolyols, preferably polyetherdiols, for example those based on ethylene oxide, propylene oxide and/or butylene oxide, preferably polypropylene glycol, in particular polyetherols. Compounds to are suitable for synthesizing a soft phase in the TPU are particularly preferably used as (b2), for example copolyesters based on adipic acid and mixtures of 1,2-ethanediol and 1,4-butanediol, copolyesters based on adipic acid and mixtures of 1,4-butanediol and 1,6-hexanediol, polyesters based on adipic acid and 3-methyl-1,5-pentanediol and/or polytetramethylene glycol (polytetrahydrofuran, PTHF), particularly preferably copolyesters based on adipic acid and mixtures of 1,2-ethanediol and 1,4-butanediol and/or polytetramethylene glycol (PTHF).

c) Compounds generally known as chain extenders, for example alkanediols of 2 to 12, preferably 2, 3, 4 or 6, carbon atoms, can be used as diols (c), it also being possible to use mixtures of said compounds. Examples are the following compounds: ethane-1,2-diol, propane-1,3-diol, hexane-1,6-diol and butane-1,4-diol.

d) Suitable catalysts which in particular accelerate the reaction between the NCO groups of the diisocyanates (a) and the hydroxyl groups of the components (b2) and (b1) are the conventional tertiary amines known from the prior art, e.g. triethylamine, dimethylcyclohexylamine, N-methylmorpholine, N,N'-dimethylpiperazine, 2-(dimethylaminoethoxy) ethanol, diazabicyclo[2.2.2]octane and the like, and in particular organic metal compounds, such as titanic acid esters. Apart from the reaction in step (i), the catalysts are usually used in amounts of from 0.0001 to 5 parts by weight per 100 parts by weight of polyhydroxy compound (b).

Suitable catalysts which accelerate the degradation reaction of the preferably high molecular weight, preferably semicrystalline, thermoplastic polyesters with the component (c) are in particular organic metal compounds, such as titanic acid esters, e.g. tetrabutyl orthotitanate, iron compounds, e.g. iron(III) acetylacetonate, tin compounds, e.g. tin diacetate, tin dioctanoate, tin dilaurate or the dialkyltin salts of aliphatic carboxylic acids, such as dibutyltin diacetate, dibutyltin dilaurate or the like.

e) In addition to catalysts, conventional assistants (e) may also be added to the components (a) and (b2). Examples are surface-active substances, flameproofing agents, antistatic agents, nucleating agents, lubricants and mold release agents, dyes and pigments, inhibitors, hydrolysis stabilizers, light stabilizers, heat stabilizers, antioxidants or stabilizers for preventing discoloration, agents for protecting from microbial degradation, inorganic and/or organic fillers, reinforcing materials and plasticizers.

Further information concerning the abovementioned assistants is to be found in the technical literature.

Mixtures containing the novel thermoplastic polyurethanes and at least one further thermoplastic material, for example polyolefins, polyester, polyamide, polyoxymethylene, polystyrene and/or styrene copolymers, are furthermore according to the invention.

The advantages according to the invention are to be described with reference to the examples below.

EXAMPLES

The preparation of examples 1 to 21 described below was carried out in a twin-screw extruder of type ZSK 58 from Werner & Pfleiderer. The length of the extruder process part was 12 barrels and the length of the barrels themselves was 4 times the screw diameter. The screw discharge from the extruder was carried out by means of a gear pump; the granulation was effected in a conventional underwater granulation means. The resulting granules were then dried in a fluidized-bed dryer at from 60 to 100° C. and in residence times of from 5 to 10 minutes to water contents of <0.03% and then heated for 15 hours at 80° C.

The temperatures of extruder barrel 1 was 260° C., that of barrels 2-4 was 250° C., that of barrel 5 was 240° C., that of barrels 6-12, including the melt discharge means, was 230° C. Under these conditions, the melt temperature of 220-230° C. resulted in the case of a throughput of about 200 kg/h and a speed of 200 rpm.

The semicrystalline, high molecular weight polyester used was a commercial polybutylene terephthalate (Ultradur® B 4500/BASF Aktiengesellschaft), the low molecular weight diol used for degrading the high molecular weight PBT was 1,4-butanediol and the aromatic diisocyanate used was 4,4'-diisocyanatodiphenylmethane (MDI). The polydiols (PDO) used are described and characterized in table 1.

TABLE 1

| Designation | Composition | Number av. mol. weight Mn (g/mol) | OH number (mg KOH/1 g) |
|---|---|---|---|
| PDO 1 | Polyester of adipic acid, ethylene glycol and 1,4-butanediol (molar ratio 1:1) | 2000 | 56.1 |
| PDO 2 | Polyester of adipic acid, 1,4-butanediol and 1,6-hexanediol (molar ratio 2:1) | 2000 | 56.1 |
| PDO 3 | Polyester of adipic acid and 3-methyl-1,5-pentanediol | 2000 | 56.1 |
| PDO 4 | Polyetherdiol based on polytetramethylene glycol | 1000 | 112.2 |

In example 1, the degradation of the Ultradur® B 4500 by 1,4-butanediol is described and the degradation products are characterized.

Ultradur® granules were metered continuously into the barrel 1 of the twin-screw extruder, 1,4-butanediol together with tin dioctanoate as a catalyst for accelerating the degradation was metered into barrel 3 and melt samples were taken from the opened barrel 5. The residence time of the melt (barrels 1-5) was about 44 seconds.

TABLE 2

| Sample No. | ULTRADUR® B 4500 kg/h | 1,4-Butanediol kg/h | Tin dioctanoate g/h |
|---|---|---|---|
| 1 | 40 | 0 | 0 |
| 2 | 40 | 1.20 | 4.0 |
| 3 | 40 | 1.80 | 4.0 |
| 4 | 40 | 2.40 | 4.0 |

For the determination of unconverted 1,4-butanediol, in each case 10 g of melt sample were powdered and then suspended in 30 g of isopropanol and stirred for 48 hours at room temperature for complete extraction of the butanediol. In the isopropanol solution, butanediol was determined by gas chromatography. The insoluble fraction was filtered off, washed with isopropanol and completely dried for several hours at 100° C. The following determinations were carried out on these extracted samples:

Viscosity number VN: A solution viscosity (m/l/g) of 0.5% strength solution in phenol/chlorobenzene (1:1) at 25° C., measured using an Ubbelohde viscometer Terminal group analysis: Dissolution in dichlorobenzene at 190° C., reaction with acetic anhydride and titration with 0.1 nNaOH solution GPC analysis: Eluent hexafluoroisopropanol+0.5% of potassium trifluoroacetate, calibration with PMMA standards having a narrow molecular weight distribution For the determination of the mechanical properties, the experimental products were processed in a conventional manner by injection molding to give test specimens, which were heated for 20 hours at 100° C. before the test.

The tests were carried out under the following conditions:

| Hardness: | Shore A or Shore D, measured according to DIN 53505 |
| TS: | Tensile strength (MPa), measured according to DIN 53504 |
| EB: | Elongation at break (%), measured according to DIN 53504 |
| TPS: | Tear propagation strength (N/mm), measured according to DIN 53515 |
| Abrasion: | Abrasion (mm3), measured according to DIN 53516 |
| DSC values: | Measured using a DSC 7 apparatus from Perkin-Elmer and evaluated according to ISO 11357-3; |

TABLE 3

| Sample No. | Content of un-converted butanediol (% by wt.) | Viscosity number VN (ml/g) | Terminal groups Hydroxyl mmol/kg | Terminal groups Acid mmol/kg | Mn values from terminal groups | Mn values from GPC |
|---|---|---|---|---|---|---|
| 1 | — | 101 | 60.6 | 32.1 | 21600 | 16800 |
| 2 | 0.29 | 26.7 | 485 | 16.0 | 4000 | 3700 |
| 3 | 0.75 | 19.6 | 675 | 17.8 | 2900 | 2700 |
| 4 | 0.85 | 16.0 | 848 | 21.4 | 2300 | 2200 |

The values in table 3 show that, in the novel process, the high molecular weight polybutylene terephthalate can be degraded within the short residence time to give polyester chains having substantially terminal hydroxyl groups and Mn values of from 2 000 to 4 000.

Examples 2 to 4 below describe how samples no. 2, 3 and 4 are further reacted according to the invention by adding polyesterdiol, MDI and tin dioctanoate in barrel 5 of the twin-screw extruder.

TABLE 4

| Example No. | Ultradur® B 4500 kg/h | Butanediol kg/h | Tin dioctanoate Barrel 3 g/h | Tin dioctanoate Barrel 5 g/h | Polyesterdiol PD02 kg/h | MDI kg/h | Molar ratio MDI/(BD0 + PD02) |
|---|---|---|---|---|---|---|---|
| 2 | 40 | 1.20 | 4.0 | 4.0 | 128.7 | 20.80 | 1.07 |
| 3 | 40 | 1.80 | 4.0 | 4.0 | 128.7 | 22.58 | 1.07 |
| 4 | 40 | 2.40 | 14.0 | 4.0 | 128.7 | 24.36 | 1.07 |
| 5 | 40 | — | — | 4.0 | 128.7 | 17.23 | 1.07 |

BD0 = Butanediol

In example 5 not according to the invention, Ultradur B 4500 was reacted with PDO 2 and MDI without degradation by butanediol but under otherwise identical reaction conditions. In contrast to the visually clear and single-phase melts from examples 2 to 4, the melt according to example 5 was opaque white, nontransparent and two-phase. After a run time of only a few minutes, agglomeration of the extremely tacky granular particles occurred in the underwater granulation means and the experiment had to be terminated. The product obtained up to then could not be processed by injection molding. For comparative measurements, 2 mm thick test plates were produced by pressing at about 190-200° C.

-continued

Heating and cooling rates:
20_K/min.
TM: Melting peak maximum (° C.) from the 2nd heating curve
TKmax: Crystallization peak maximum (° C.) from the cooling curve These conditions apply to examples 2 to 5 as well as to all examples below.

TABLE 5

| Example No. | Hardness | TS | EB | TPS | Abrasion | VN | DSC values TM | DSC values TKmax |
|---|---|---|---|---|---|---|---|---|
| 2 | 67 A | 19 | 850 | 41 | 57 | 329 | 209 | 165 |
| 3 | 71 A | 23 | 880 | 50 | 47 | 328 | 196 | 134 |

TABLE 5-continued

| Example No. | Hardness | TS | EB | TPS | Abrasion | VN | DSC values TM | TKmax |
|---|---|---|---|---|---|---|---|---|
| 4 | 73 A | 25 | 840 | 51 | 47 | 337 | 186 | 119 |
| 5 | 58 A | 8 | 800 | 10 | >500 | 222 | 212 | 159 |

The values of the novel experimental products (examples 24) exhibit an excellent property level, in particular with regard to the solidification behavior in injection molding.

The values of example 5 not according to the invention show that it is merely a physical mixture of a high molecular weight PBT with a high molecular weight polyurethane soft phase, resulting not only in the extreme tack but also in the low tensile strength, low tear propagation strength and extremely high abrasion.

In examples 6 to 9 below, it is intended to show that products having a hardness of from Shore 44 D to 75 D can be prepared by the novel process.

TABLE 6

| Example No. | Ultradur ® B 4500 kg/h | Butanediol kg/h | Tin dioctanoate Barrel 3 g/h | Tin dioctanoate Barrel 5 g/h | Polyesterdiol PDO2 kg/h | MDI kg/h | Molar ratio MDI/(BD0 + PD02) |
|---|---|---|---|---|---|---|---|
| 6 | 65.7 | 3.30 | 4.0 | 4.0 | 56.0 | 17.1 | 1.06 |
| 7 | 75.0 | 4.50 | 4.0 | 4.0 | 43.7 | 19.0 | 1.06 |
| 8 | 87.0 | 5.22 | 4.0 | 4.0 | 30.60 | 19.43 | 1.06 |
| 9 | 99.0 | 5.94 | 4.0 | 4.0 | 19.40 | 20.06 | 1.06 |

In addition to the substances stated in table 6, 1.45 kg/h of a powder mixture consisting of 25% of a finely divided talc (talc IT extra from Omya), 25% of an antioxidant (Irganox® 1010 from Ciba-Geigy) and 50% of a lubricant and mold release agent (Uniwax 1760 from Uniqema) were added to barrel 8 of the twin-screw extruder via a laterally mounted screw metering apparatus. The total throughput was then 144-146 kg/h.

TABLE 7

| Example No. | Hardness | TS | EB | TPS | Abrasion | VN | DSC values TM | TKmax |
|---|---|---|---|---|---|---|---|---|
| 6 | 44 D | 32 | 590 | 112 | 15 | 271 | 190 | 140 |
| 7 | 54 D | 38 | 410 | 151 | 18 | 249 | 189 | 142 |
| 8 | 66 D | 49 | 440 | 183 | 16 | 241 | 193 | 150 |
| 9 | 75 D | 45 | 430 | 251 | 20 | 229 | 195 | 155 |

In examples 10 to 17 below, it is intended to show that products having a hardness of from Shore 50 A to 80 A can be prepared by the novel process.

TABLE 8

| Example No. | Ultradur ® B 4500 kg/h | Butanediol kg/h | Tin dioctanoate Barrel 3 g/h | Tin dioctanoate Barrel 5 G/h | Polyesterdiol PD01 kg/h | MDI kg/h | Molar ratio MDI/(BD0 + PD01) |
|---|---|---|---|---|---|---|---|
| 10 | 20.0 | 1.20 | 4.0 | 4.0 | 146.9 | 24.24 | 1.116 |
| 11 | 27.0 | 1.62 | 4.0 | 4.0 | 139.3 | 24.48 | 1.116 |
| 12 | 33.0 | 1.98 | 4.0 | 4.0 | 132.7 | 24.66 | 1.116 |
| 13 | 40.0 | 2.40 | 4.0 | 4.0 | 125.0 | 24.90 | 1.116 |

TABLE 9

| Example No. | Ultradur ® B 4500 kg/h | Butanediol kg/h | Tin dioctanoate Barrel 3 g/h | Tin dioctanoate Barrel 5 g/h | Polyesterdiol PD02 kg/h | Polyesterdiol PD03 kg/h | MDI kg/h | Molar ratio MDI (BD0 + PD02 + PD03) |
|---|---|---|---|---|---|---|---|---|
| 14 | 22.0 | 1.10 | 4.0 | 4.0 | 118.2 | 29.5 | 23.05 | 1.07 |
| 15 | 27.5 | 1.38 | 4.0 | 4.0 | 114.1 | 28.5 | 23.20 | 1.07 |
| 16 | 33.0 | 1.65 | 4.0 | 4.0 | 109.2 | 27.3 | 23.18 | 1.07 |
| 17 | 36.5 | 1.86 | 4.0 | 4.0 | 106.4 | 26.6 | 23.33 | 1.07 |

In addition to the substances stated in tables B and 9, 2.00 kg/h of a powder mixture which has been described above in the case of examples 6 to 9 were introduced into barrel 8 of the twin-screw extruder.

TABLE 10

| Example No. | Hardness | TS | EB | TPS | Abrasion | DSC values | | |
|---|---|---|---|---|---|---|---|---|
| | | | | | | VN | TM | TKmax |
| 10 | 57 A | 23 | 880 | 41 | 36 | 461 | 200 | 155 |
| 11 | 65 A | 25 | 820 | 46 | 35 | 476 | 195 | 140 |
| 12 | 71 A | 23 | 850 | 53 | 33 | 472 | 200 | 150 |
| 13 | 77 A | 31 | 860 | 62 | 35 | 458 | 197 | 144 |
| 14 | 52 A | 19 | 1240 | 24 | 104 | 387 | 195 | 139 |
| 15 | 56 A | 18 | 1330 | 31 | 82 | 354 | 198 | 145 |
| 16 | 65 A | 26 | 1060 | 37 | 68 | 361 | 201 | 153 |
| 17 | 69 A | 28 | 1080 | 41 | 68 | 348 | 197 | 155 |

In addition to good mechanical properties, the products according to examples 10 to 17 show pronounced and very good solidification and crystallization behavior which has a very positive effect on the processing behavior in injection molding and in extrusion, as will be shown below.

Examples 14 to 17 demonstrate that mixtures of polyesterdiols having different chemical structures can also be used in the novel process. This is sometimes important for suppressing subsequent crystallization of the originally amorphous polyurethane soft phase and hence subsequent hardening during storage of the products In addition to polyesterdiols, polyetherdiols or polyesterdiol/polyetherdiol mixtures can also be used in the novel process, as will be explained with reference to examples 18 to 20.

TABLE 11

| Example No. | Ultradur® B 4500 kg/h | Butanediol kg/h | Tin dioctanoate | | Polyesterdiol PD04 kg/h | MDI kg/h | Molar ratio MDI/(BD0 + PD04) |
|---|---|---|---|---|---|---|---|
| | | | Barrel 3 g/h | Barrel 5 g/h | | | |
| 18 | 34.0 | 2.76 | 4.0 | 4.0 | 118.2 | 39.48 | 1.06 |
| 19 | 50.0 | 4.02 | 4.0 | 4.0 | 101.6 | 38.79 | 1.06 |
| 20 | 70.0 | 5.64 | 4.0 | 4.0 | 80.74 | 38.02 | 1.06 |

In addition to the substances stated in table 11, 2.00 kg/h of a powder mixture as described in the case of examples 6 to 9 were introduced into barrel 8 of the twin-screw extruder

TABLE 12

| Example No. | Hardness | TS | EB | TPS | Abrasion | DSC value | | |
|---|---|---|---|---|---|---|---|---|
| | | | | | | VN | TM | TKmax |
| 18 | 70 A | 40 | 710 | 38 | 30 | 1603 | 178 | 71 |
| 19 | 80 A | 43 | 610 | 64 | 27 | 1282 | 176 | 75 |
| 20 | 90 A | 50 | 470 | 74 | 30 | 640 | 180 | 80 |

In example 21 below, it is intended to show that a commercial polyethylene terephthalate (polyester type RT 51 from Kosa) can be reacted according to the novel process.

TABLE 13

| Example No. | PET RT 51 kg/h | Butanediol kg/h | Tin dioctanoate | | Polyesterdiol PD02 kg/h | Polyesterdiol PD03 kg/h | MDI kg/h | Molar ratio MDI/(BD0 + PD02 + PD03) |
|---|---|---|---|---|---|---|---|---|
| | | | Barrel 3 g/h | Barrel 5 g/h | | | | |
| 21 | 36.5 | 2.92 | 12.0 | 4.0 | 105.4 | 26.3 | 25.33 | 1.03 |

Owing to the higher melting range of polyethylene terephthalate, the temperature profile of the twin-screw extruder was changed in the following manner:

| | |
|---|---|
| Barrels 1 to 4: | 270° C. |
| Barrel 5: | 260° C. |
| Barrels 6 to 12: | 250° C. |
| Melt discharge means: | 230° C. |

In addition to the substances stated in table 13, 2.00 kg/h of a powder mixture as described in the case of examples 6 to 9 were introduced into barrel 8 of the twin-screw extruder.

TABLE 14

| Example No. | Hardness | TS | EB | TPS | Abrasion | VN | DSC values TM | TKmax |
|---|---|---|---|---|---|---|---|---|
| 21 | 68 A | 15 | 960 | 24 | 120 | 230 | 238 | 196 |

In examples 22 to 24 below, it is intended to show that an aliphatic diisocyanate/hexamethylene 1,6-diisocyanate (HDI) can be reacted according to the novel process.

TABLE 15

| | Ultradur ® | | Tin dioctanoate | | Polyesterdiol | | |
|---|---|---|---|---|---|---|---|
| Example No. | B 4500 kg/h | Butanediol kg/h | Barrel 3 g/h | Barrel 5 g/h | PD02 kg/h | HDI kg/h | Molar ratio HDI/(BD0 + PD02) |
| 22 | 37.5 | 2.25 | 4.0 | 12.0 | 95.8 | 12.38 | 1.01 |
| 23 | 45.0 | 2.70 | 4.0 | 12.0 | 87.7 | 12.53 | 1.01 |
| 24 | 52.5 | 3.15 | 4.0 | 12.0 | 79.5 | 12.69 | 1.01 |

TABLE 16

| Example No. | Hardness | TS | EB | TPS | Abrasion | VN | DSC values TM | TKmax |
|---|---|---|---|---|---|---|---|---|
| 22 | 79 A | 13 | 950 | 41 | 100 | 150 | 179 | 71 |
| 23 | 84 A | 15 | 880 | 50 | 52 | 163 | 179 | 68 |
| 24 | 89 A | 19 | 820 | 60 | 41 | 148 | 182 | 63 |

The present examples 2 to 24 show that block copolymers which differ from the commercial thermoplastic polyurethanes in that the customary hard phase segment, consisting of butanediol/MDI units, was exchanged for semicrystalline, rapidly crystallizing, hard polyester segments can be prepared by the novel process.

It is possible to prepare products which cover a hardness range of from Shore 50 A to Shore 75 D and have elastomeric behavior, in particular the advantageous properties of the commercial thermoplastic polyurethanes, such as high strengths in combination with high elongation at break, high tear propagation strengths and high abrasion resistances.

However, the advantage over the commercial thermoplastic polyurethanes is based on the narrow melting range and the tendency of the semicrystalline polyester hard phase to crystallize, so that problem-free and rapid processing by injection molding and by extrusion is possible even in the case of very soft products having a hardness of from Shore 50 A to Shore 75 A.

These advantageous processing properties are to be explained in examples 25 and 26 below.

DE-A 199 39 112 describes thermoplastic polyurethanes having a hardness of from Shore 50 A to 75 A. The experimental products according to examples 9, 10 and 11 of DE-A 199 39 112 are based on polyesterdiol PDO 1, like the products according to examples 10, 11 and 12 of the present invention.

TABLE 17

| | Hardness |
|---|---|
| DE-A 199 39 112 | |
| Example 9 | 73 A |
| Example 10 | 66 A |
| Example 11 | 58 A |
| According to the invention | |
| Example 10 | 57 A |
| Example 11 | 65 A |
| Example 12 | 71 A |

Example 25

Processability by Injection Molding

The products mentioned in table 15 were processed on an injection molding machine, type ES 330/125 from Engel, under optimized conditions to give a round disk having a diameter of 120 mm and a thickness of 2 mm. Optimized conditions mean that, for each individual product, the injection conditions, the temperature profile of the injection unit and the hot runner, and the tool surface temperatures were varied and optimized until a homogeneous, planar round disk having good demoldability and dimensional stability resulted. The cycle times determined after such a process represent a good comparative standard for rating the processability, shorter cycle times being positively rated.

TABLE 18

| | DEA 199 39 112 Examples | | | According to the invention Examples | | |
|---|---|---|---|---|---|---|
| | 11 | 10 | 9 | 10 | 11 | 12 |
| Hardness (Shore) | 58 A | 66 A | 73 A | 57 A | 65 A | 71 A |
| Cycle time (sec) | 100 | 90 | 75 | 45 | 40 | 35 |

Example 26

Processability by Extrusion

Production of Blown Films

The products described in table 15 were processed to give blown films on a Brabender laboratory unit comprising melting extruder, film blowing head and take-off apparatus. After appropriate optimization of the extruder temperature profile, of the annular gap width of the film blowing head, of the blow air flow rate and of the take-off speed, satisfactory blown films could be produced and wound in all cases. In case of the products according to DE-A 199 39 112, however, the transparent blown films stuck together to such an extent during winding that the spool could no longer be unwound later on without destruction of the film. Owing to the strong adhesion, it was also impossible to blow up the tubular film.

The novel products on the other hand gave slightly opaque tubular films without any tendency to stick. The spools were always readily unwindable later on and the tubular film itself could be blown up without problems. There were no detectable differences between the individual hardness gradations with respect to tendencies to adhere.

What is claimed is:

1. A mixture containing a thermoplastic polyurethane and at least one further thermoplastic material, wherein the thermoplastic polyurethane comprises the reaction product of (a) isocyanates with (b1) polyesterdiols having a melting point greater than 150° C., (b2) polyetherdiols and/or polyester diols, each having a melting point of less than 150° C. and a molecular weight of from 501 to 8,000 g/mol, and, optionally, (c) diols having a molecular weight of from 62 to 500 g/mol.

2. The mixture as claimed in claim 1, wherein the molar ratio of the diols (c) having a molecular weight of from 62 to 500 g/mol to the component (b2) is less than 0.2.

3. The mixture as claimed in claim 1, wherein the polyesterdiols (b1) have the following structural unit (I):

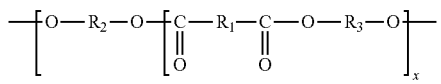

where
$R_1$ is a carbon skeleton of 2 to 15 carbon atoms,
$R_2$ is an alkylene group of 2 to 8 carbon atoms,
$R_3$ is an alkylene group of 2 to 8 carbon atoms, and
X is an integer from 5 to 30.

4. The mixture as claimed in claim 1, wherein the polyesterdiol (b1) has a molecular weight of from 1,000 to 5,000 g/mol.

5. A process for the preparation of thermoplastic polyurethanes, wherein
(i) a thermoplastic polyester is reacted with a diol (c) and then
(ii) the reaction product of (i) containing (b1) polyesterdiol having a melting point greater than 150° C. and, optionally, (c) diol together with (b2) polyetherdiols and/or polyesterdiols, each having a melting point of less than 150° C. and a molecular weight of from 501 to 8,000 g/mol and, optionally, further (c) diols having a molecular weight of from 62 to 500 g/mol are reacted with (a) isocyanate, in the presence or absence of (d) catalysts and/or (e) assistants.

6. The process as claimed in claim 5, wherein the thermoplastic polyester has a molecular weight of from 15,000 to 40,000 g/mol.

7. The process as claimed in claim 5, wherein the thermoplastic polyester used is a polyalkylene terephthalate and/or a poly-L-lactic acid.

8. The process as claimed in claim 5, wherein the thermoplastic polyester is melted at from 180 to 270° C. and the reaction (i) with the diol (c) is carried out at from 240 to 280° C.

9. The process as claimed in claim 5, wherein the reaction of the thermoplastic polyester with the diol (c) is carried out in the presence of a catalyst.

10. The process as claimed in claim 5, wherein butane-1,4-diol and/or ethane-1,2-diol are used as diol (c) in (i) and, optionally, in (ii).

11. The process as claimed in claim 5, wherein the reactions (i) and (ii) are carried out in a reaction extruder.

12. The process as claimed in claim 11, wherein the reaction extruder has neutral and/or backward-conveying kneading blocks and backward-conveying elements in the region in which the thermoplastic polyester is melted and screw mixing elements, toothed disks and/or toothed mixing elements in combination with backward-conveying elements in the region in which the thermoplastic polyester is reacted with the diol.

13. The process as claimed in claim 5, wherein, in the reaction (ii), the ratio of the isocyanate groups to the hydroxyl groups is from 1:1 to 1.2:1.

14. The mixture as claimed in claim 3, wherein $R_2$ is a straight-chain or branched alkylene group of 2 to 6 carbon atoms.

15. The mixture as claimed in claim 3, wherein $R_3$ is a straight-chain or branched alkylene group of 2 to 6 carbon atoms.

16. The mixture as claimed in claim 1, wherein the further thermoplastic material is selected from the group of polyolefins, polyester, polyamide, polyoxymethylene, polystyrene and/or styrene copolymers, and combinations thereof.

17. A film, shaped article, roller, fiber or cladding in an automobile, hose, cable plug, bellows, trailing cable, cable sheath, seal, belt or damping element containing the mixture as claimed in claim 1.

18. A mixture containing a thermoplastic polyurethane and at least one further thermoplastic material, the thermoplastic polyurethane prepared by a process wherein
(i) a thermoplastic polyester is reacted with a diol (c) and then
(ii) the reaction product of (i) containing (b1) polyesterdiol having a melting point greater than 150° C. and, optionally, (c) diol together with (b2) polyetherdiols and/or polyesterdiols, each having a melting point of less than 150° C. and a molecular weight of from 501 to 8,000 g/mol and, optionally, further (c) diols having a molecular weight of from 62 to 500 g/mol are reacted with (a) isocyanate, in the presence or absence of (d) catalysts and/or (e) assistants.

19. The mixture as claimed in claim 18, wherein the thermoplastic polyurethane has a hardness range of from Shore 45 A to Shore 78 D.

20. A film, shaped article, roller, fiber or cladding in an automobile, hose, cable plug, bellows, trailing cable, cable sheath, seal, belt or damping element containing the mixture as claimed in claim 18.

21. The mixture as claimed in claim 18, wherein the thermoplastic polyester has a molecular weight of from 15,000 to 40,000 g/mol.

22. The mixture as claimed in claim 18, wherein the thermoplastic polyester used is a polyalkylene terephthalate and/or a poly-L-lactic acid.

23. The mixture as claimed in claim 18, wherein the thermoplastic polyester is melted at from 180 to 270° C. and the reaction (i) with the diol (c) is carried out at from 240 to 280° C.

24. The mixture as claimed in claim 18, wherein the reaction of the thermoplastic polyester with the diol (c) is carried out in the presence of a catalyst.

25. The mixture as claimed in claim 18, wherein butane-1,4-diol and/or ethane-1,2-diol are used as diol (c) in (i) and, optionally, in (ii).

26. The mixture as claimed in claim 18, wherein the reactions (i) and (ii) are carried out in a reaction extruder.

27. The mixture as claimed in claim 26, wherein the reaction extruder has neutral and/or backward-conveying kneading blocks and backward-conveying elements in the region in which the thermoplastic polyester is melted and screw mixing elements, toothed disks and/or toothed mixing elements in combination with backward-conveying elements in the region in which the thermoplastic polyester is reacted with the diol.

28. The mixture as claimed in claim 18, wherein, in the reaction (ii), the ratio of the isocyanate groups to the hydroxyl groups is from 1:1 to 1.2:1.

29. The mixture as claimed in claim 18, wherein the further thermoplastic material is selected from the group of polyolefins, polyester, polyamide, polyoxymethylene, polystyrene and/or styrene copolymers, and combinations thereof.

30. A thermoplastic polyurethane comprising the reaction product of (a) isocyanates with (b1) polyesterdiols having a melting point of from 165 to 260° C., (b2) polyetherdiols and/or polyester diols, each having a melting point of less than 150° C. and a molecular weight of from 501 to 8,000 g/mol, and, optionally, (c) diols having a molecular weight of from 62 to 500 g/mol.

31. The thermoplastic polyurethane as claimed in claim 30, wherein the (b1) polyesterdiols have a melting point of from 165 to 245° C.

32. The thermoplastic polyurethane as claimed in claim 30, wherein the molar ratio of the diols (c) having a molecular weight of from 62 to 500 g/mol to the component (b2) is less than 0.2.

33. The thermoplastic polyurethane as claimed in claim 30, wherein the polyesterdiols (b1) have the following structural unit (I):

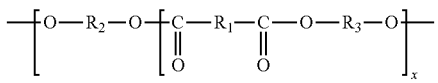

where
$R_1$ is a carbon skeleton of 2 to 15 carbon atoms,
$R_2$ is an alkylene group of 2 to 8 carbon atoms,
$R_3$ is an alkylene group of 2 to 8 carbon atoms, and
X is an integer from 5 to 30.

34. The thermoplastic polyurethane as claimed in claim 30, wherein the polyesterdiol (b1) has a molecular weight of from 1,000 to 5,000 g/mol.

35. The thermoplastic polyurethane as claimed in claim 33, wherein $R_2$ is a straight-chain or branched alkylene group of 2 to 6 carbon atoms.

36. The thermoplastic polyurethane as claimed in claim 33, wherein $R_3$ is a straight-chain or branched alkylene group of 2 to 6 carbon atoms.

37. A film, shaped article, roller, fiber or cladding in an automobile, hose, cable plug, bellows, trailing cable, cable sheath, seal, belt or damping element containing a thermoplastic polyurethane as claimed in claim 30.

38. A mixture containing the thermoplastic polyurethane as claimed in claim 30 and at least one further thermoplastic material.

39. The mixture as claimed in claim 38, wherein the further thermoplastic material is selected from the group of polyolefins, polyester, polyamide, polyoxymethylene, polystyrene and/or styrene copolymers, and combinations thereof.

* * * * *

UNITED STATES PATENT AND TRADEMARK OFFICE
CERTIFICATE OF CORRECTION

PATENT NO. : 8,680,213 B2  
APPLICATION NO. : 11/774766  
DATED : March 25, 2014  
INVENTOR(S) : Pohlmann et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1098 days.

Signed and Sealed this
Eleventh Day of August, 2015

Michelle K. Lee
*Director of the United States Patent and Trademark Office*